United States Patent [19]

Orlando

[11] Patent Number: 5,502,685
[45] Date of Patent: Mar. 26, 1996

[54] CONTINUOUS BATCH MIX SPRAYER

[75] Inventor: Franklin P. Orlando, Morgan Hill, Calif.

[73] Assignee: FMC Corporation, Chicago, Ill.

[21] Appl. No.: 161,024

[22] Filed: Dec. 3, 1993

[51] Int. Cl.⁶ .............................. B01F 15/02; B01F 15/04
[52] U.S. Cl. ......................... 366/132; 137/113; 137/256; 239/61; 366/160.2
[58] Field of Search .................................. 366/131, 132, 366/160, 161, 14, 15, 177; 137/113, 256; 239/61, 172, 398, 413

[56]  References Cited

U.S. PATENT DOCUMENTS

| | | | |
|---|---|---|---|
| 2,618,576 | 11/1952 | Brown | 366/14 |
| 3,617,029 | 11/1971 | Breer | 366/160 |
| 4,358,054 | 11/1982 | Ehrat | 239/61 |
| 4,881,820 | 11/1989 | Luckhoff | 366/162 |
| 4,932,609 | 6/1990 | Secchiaroli | 137/256 |

*Primary Examiner*—Robert W. Jenkins
*Attorney, Agent, or Firm*—Michael Lee; R. C. Kamp

[57] ABSTRACT

The invention provides a chemical mixture device that avoids the mixing of large batches of chemicals and provides a continuous and precisely mixed mixture. For mixing water and a chemical, a large water tank and a chemical tank supply water and chemicals to first and second mixing tanks. As small batches are mixed in one mixing tank, the mixture is drawn from the other mixing tank.

12 Claims, 3 Drawing Sheets

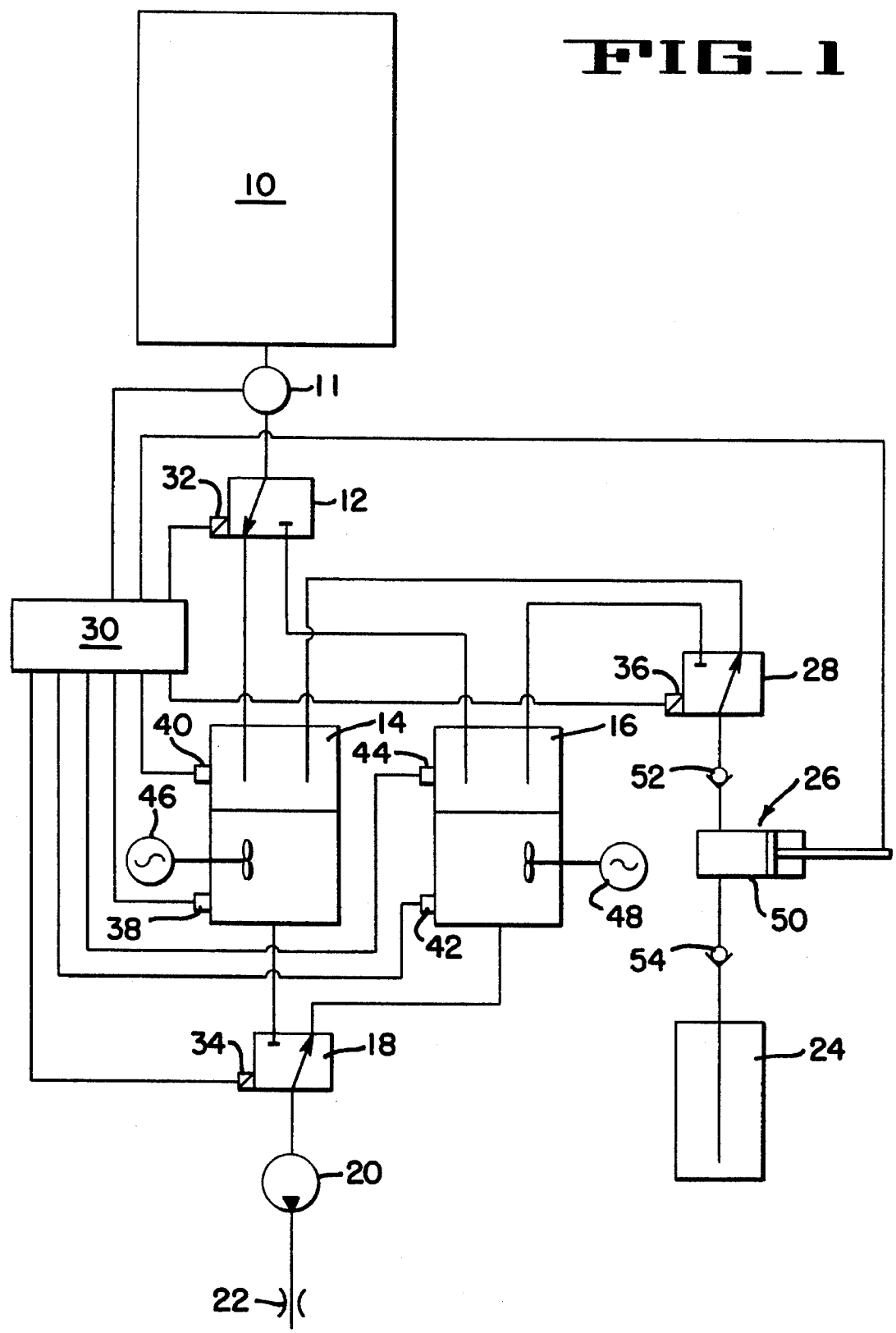
FIG_1

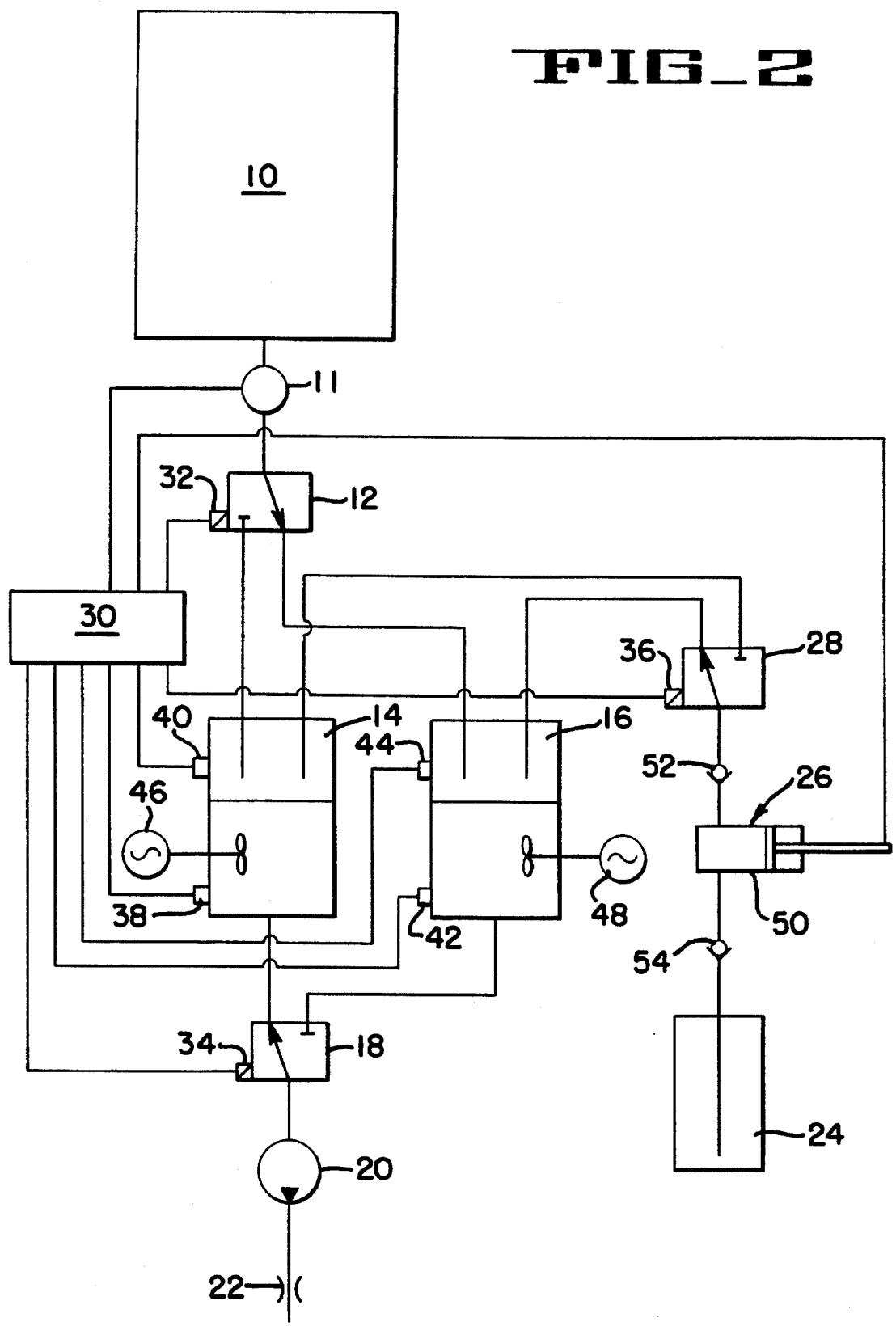
FIG_2

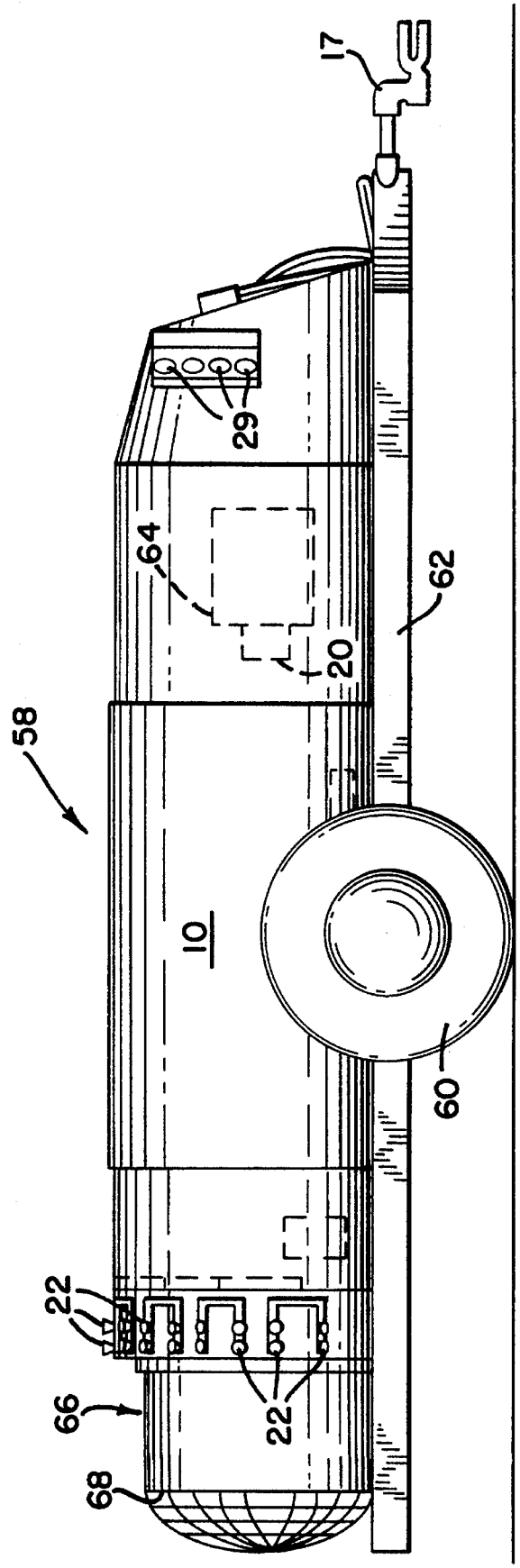

CONTINUOUS BATCH MIX SPRAYER

In the prior art there are two methods of mixing agricultural chemicals for spraying. In one method large quantities of chemicals would be mixed all at once in a large sprayer tank. If the chemicals are not mixed correctly, or if too much is mixed, the user may have a few hundred gallons of agricultural chemicals to dispose of. With new regulations, such disposal is costly and difficult. In another method the chemicals are mixed at the nozzle. Such devices for this method provide imprecise and non-uniform mixing.

The invention provides a method and apparatus for mixing chemicals for a sprayer that mixes small quantities at a time and provides precise measurements for mixing.

FIG. 1 is a schematic diagram of the inventive continuous batch mix sprayer in a first position.

FIG. 2 is a schematic diagram of the inventive continuous batch mix sprayer in a second position.

FIG. 3 is a side view of an orchard sprayer that uses the inventive continuous batch mix sprayer.

The schematic diagrams of FIGS. 1 and 2 show a main water tank 10, with a fluid connection to a water valve 11, which is in fluid connection with a water switch 12. A first mixing tank 14 and a second mixing tank 16 are in fluid connection with the water switch 12. The first mixing tank 14 and the second mixing tank 16 are in fluid connection with a mixture switch 18, which is in fluid connection with a high pressure main sprayer pump 20. The high pressure main sprayer pump 20 is in fluid connection with a sprayer nozzle 22. A chemical tank 24 is in fluid connection with a chemical metering pump 26. The chemical metering pump is in fluid connection with a chemical switch 28, which is in fluid contact with the first mixing tank 14 and the second mixing tank 16.

A control means 30 is electrically connected to the water valve 11. The control means 30 is also electrically connected to a controller for the water switch 32. A controller for the mixture switch 34 and a controller for the chemical switch 36 are also electrically connected to the control means 30. The chemical metering pump 26 is also electrically connected to the control means 30. The first mixing tank 14 has an empty sensor 38, which indicates when the level of fluid in the first mixing tank is below a certain level, and which is electrically connected to the control means 30. The first mixing tank 14 also has an full sensor 40, which indicates when the level of fluid in the first mixing tank is above a certain level, and which is electrically connected to the control means 30. The second mixing tank 16 has an empty sensor 42, which indicates when the level of fluid in the second mixing tank is below a certain level, and which is electrically connected to the control means 30. The second mixing tank 16 also has an full sensor 44, which indicates when the level of fluid in the second mixing tank is above a certain level, and which is electrically connected to the control means 30.

The first mixing tank 14 comprises a container that is small compared to the main water tank 10, typically between 1 and 10 gallons, which has a mixing device 46 attached. The second mixing tank 16 comprises a container that is small compared to the main water tank 10, typically between 1 and 10 gallons, which has a mixing device 48 attached.

The chemical metering pump 26, comprises a piston in a cylinder 50 with a first one way valve 52 in front of the piston in a cylinder 50 and a second one way valve 54 in back of the piston in a cylinder 50.

The main water tank 10 provides water through the water valve 11 and the water switch 12 to either the first mixing tank 14 or the second mixing tank 16. The water valve 11 starts or stops the flow of water from the main water tank 10 to the water switch 12. The water switch 12, which is connected between the water valve 11 and the first mixing tank 14 and the second mixing tank 16, switches the water delivery between the first mixing tank 14 and the second mixing tank 16. A switch as used in the specification and claims is either a device that switches between from where something is received or a device that switches between where something is delivered. The control means 30 sends signals to the controller for the water switch 32, which then controls whether water is delivered from the main water tank 10 to the first mixing tank 14 or the second mixing tank 16. In the preferred embodiment, water flows from the main water tank 10 by gravity. However, in other embodiments, a pump may be used to draw water from the main water tank. In the preferred embodiment, the control means 30 also sends a signal to the water valve 11 to either allow the flow of water from the main water tank 10 or to stop the flow of water from the main water tank 11. However, in other embodiments, the functions of the water valve 11 and the water switch can be combined into one three position switch or valve.

The chemical metering pump 26 pumps a measured amount of chemical from the chemical tank 24 through the chemical switch 28 to either the first mixing tank 14 or the second mixing tank 16. The chemical switch 28, which is connected between the chemical metering pump 28 and the first mixing tank 14 and the second mixing tank 16, switches the chemical delivery between the first mixing tank 14 and the second mixing tank 16. The control means 30 sends signals to the controller for the chemical switch 36, which then controls whether chemical is delivered from the chemical metering pump 28 to the first mixing tank 14 or the second mixing tank 16.

The high pressure main spray pump 20 receives the mixture from either the first mixing tank 14 or the second mixing tank 16. The mixture switch 18, which is connected between the high pressure main spray pump and the first mixing tank 14 or the second mixing tank 16, switches between the first mixing tank 14 and the second mixing tank 16. The control means 30 sends signals to the controller for the mixture switch 34, which then controls whether mixture is delivered from the first mixing tank 14 or the second mixing tank 16 to the high pressure main sprayer pump 20.

The control means 30 also controls the amount of chemical delivered by controlling the chemical metering pump 26. The control means receives input from the empty sensor 38 for the first mixing tank 14, the full sensor 40 for the first mixing tank 16, the empty sensor 42 for the second mixing tank 16, and the full sensor 44 for the second mixing tank 16.

In operation the apparatus is set as shown in FIG. 1. In FIG. 1, water is provided from the main water tank 10 through the water switch 12 to the first mixing tank 14. The chemical is drawn from the chemical tank 24 by the chemical metering pump 26 and pumped through the chemical switch 28 to the first mixing tank 14. When the full sensor 40 of the first mixing tank 14 senses that the first mixing tank 14 is full, a signal is sent to control means 30 from the full sensor 40 of the first mixing tank 14. The control means 30 then sends a signal to the water valve 11, causing the water valve 11 to close, stopping the flow of water from the main water tank 10. Although the flow of water to the first mixing tank is stopped, the mixing device 46 for the first mixing tank 14 continues to mix the water and chemical together.

The mixture is drawn from the second mixing tank 16 through the mixture switch 18, to the high pressure main sprayer pump 20 which sprays the mixture through the sprayer nozzle 22.

When the level of the mixture in the second mixing tank 16 falls below the empty sensor 42 of the second mixing tank 16, a signal is sent from the empty sensor 42 of the second mixing tank 16 to the control means 30. The control means 30, then sends a signal to the mixture switch 18 causing it to stop drawing from the second mixing tank 16 and start drawing from the first mixing tank 14. The control means 30 also sends a signal to the chemical switch 28 causing the chemical to be sent to the second mixing tank 16. The control as means 30 sends a signal to the water switch 12 causing the water to be sent to the second mixing tank 16. The control means 30 sends a signal to the water valve 11 to allow the flow of water from the main water tank 10 to the water switch 12. So the switches 12, 18, and 28 are set as shown in FIG. 2. As the water from the water tank 10 fills the second mixing tank 16, a signal is sent from the control means 30 to the chemical metering pump 26, causing the chemical metering pump 26 to provide a set volume of chemical to the second mixing tank 16. When the full sensor 44 of the second mixing tank 16 senses that the second mixing tank 16 is full, a signal is sent to control means 30 from the full sensor 44 of the second mixing tank 16. The control means 30 then sends a signal to the water valve 11, causing the water valve 11 to close, stopping the flow of water from the main water tank 10. Although the flow of water to the second mixing tank 16 is stopped, the mixing device 48 for the second mixing tank 16 continues to mix the water and chemical together. Since a set volume of chemical is provided by the chemical metering pump 26 to the second mixing tank 16, and water is added until the mixture reaches the full sensor 44 of the second mixing tank 16, the water and chemical are mixed at a set ratio. During this time, mixture is drawn from the first mixing tank 14, through the mixture switch 18 by the high pressure main sprayer pump 20, which sprays it through the sprayer nozzle 22. The flow of water and chemical into the second mixing tank 16 is set so that the level of the mixture in the second mixing tank 16 reaches the full sensor 44 of the second mixing tank 16 before the level of the mixture in the first mixing tank 14 reaches the empty sensor 38 of the first mixing tank 14.

When the level of the mixture in the first mixing tank 14 falls below the empty sensor 38 of the first mixing tank 14, a signal is sent from the empty sensor 38 of the first mixing tank 14 to the control means 30. The control means 30, then sends a signal to the mixture switch 18 causing it to stop drawing from the first mixing tank 14 and start drawing from the second mixing tank 16. The control means 30 also sends a signal to the chemical switch 28 causing the chemical to be sent to the first mixing tank 14. The control means 30 sends a signal to the water switch 12 causing the water to be sent to the first mixing tank 14. The control means 30 sends a signal to the water valve 11 to allow the flow of water from the main water tank 10 to the water switch 12. So the switches 12, 18, and 28 are set as shown in FIG. 1. As the water from the water tank 10 fills the first mixing tank 14, a signal is sent from the control means 30 to the chemical metering pump 26, causing the chemical metering pump 26 to provide a set volume of chemical to the first mixing tank 14. When the full sensor 40 of the first mixing tank 14 senses that the first mixing tank 14 is full, a signal is sent to control means 30 from the full sensor 40 of the first mixing tank 14. The control means 30 then sends a signal to the water valve 11, causing the water valve 11 to close, stopping the flow of water from the main water tank 10. Although the flow of water to the first mixing tank 14 is stopped, the mixing device 46 for the first mixing tank 14 continues to mix the water and chemical together. Since a set volume of chemical is provided by the chemical metering pump 26 to the first mixing tank 14, and water is added until the mixture reaches the full sensor 40 of the first mixing tank 14, the water and chemical are mixed at a set ratio. During this time, mixture is drawn from the second mixing tank 16, through the mixture switch 18 by the high pressure main sprayer pump 20, which sprays it through the sprayer nozzle 22. The flow of water and chemical into the first mixing tank 14 is set so that the level of the mixture in the first mixing tank 14 reaches the full sensor 40 of the first mixing tank 14 before the level of the mixture in the second mixing tank 16 reaches the empty sensor 42 of the second mixing tank 16.

Thus the invention provides a continuous spray with a consistent mixture, with a consistent ratio between water and a chemical, which is not accomplished by the prior art nozzle mixing sprayers. The invention does not ever mix a large batch at one time, unlike the prior art large batch sprayers, but continuously provides a large amount of the mixture.

In the preferred embodiment the main water tank 10 may be 200 gallons and the first mixing tank 14 and the second mixing tank 16 are each 10 gallons. The first mixing tank and the second mixing tank may range from 1 to 20 gallons. In the preferred embodiment, the main water tank 10 should be at least ten times greater in volume than the first mixing tank 14 and the second mixing tank 16. The chemical tank 24 can either be a permanent tank or could utilize the container the chemical comes in, and thus be disposable. The chemical tank 24, would be on the order of the size of the water tank times the ratio between the chemical and water in the mixture. In the preferred embodiment, the main water tank 10 would be at least two times the size of the chemical tank 24.

FIG. 3 is a side view of an orchard sprayer 58 that uses the inventive continuous batch sprayer. The orchard sprayer 58 is mounted on two wheels 60, which hold a frame 62. On the front of the frame 62 is a tongue 17, for mounting the orchard sprayer 58 to a tractor, which would pull the orchard sprayer 58. The orchard sprayer 58 would have an engine 64, which provides power to the orchard sprayer 58 and drives the high pressure main spray pump 20. Also shown in FIG. 3 is the main water tank 10, and a plurality of sprayer nozzles 22. A blower assembly 66, comprising an air inlet 68 and a fan (not shown). The blower assembly, blows air by the sprayer nozzles 22 to help distribute the mixture. Sensors 29 are provided near the front of the orchard sprayer 58 to determine the presence of near by trees.

The controller 30 accepts input from the sprayer operator to set the chemical mix ratio as appropriate for the chemical and the crop to be sprayed. The controller has software so that for a specific ratio, the controller determines the volume of chemical to be provided to the mixing tanks. In the preferred embodiment, the controller has software which is able to relate the ratios to the type of crops, to either automatically set the ratios or to give a warning if improper ratios are designated.

In other embodiments, other fluids could be mixed instead of water and a chemical. In another embodiment, more than one chemical pump 26 may be used to mix more than one chemical with the water. In another embodiment, turbulence from water entering the containers 14 and 16 may be used to mix instead of mixers 46 and 48. In another embodiment, more than one high pressure nozzle may be used. In another embodiment the chemical switch could be replaced by a means for diverting the chemical through the water switch.

While a preferred embodiment of the present invention has been shown and described herein, it will be appreciated that various changes and modifications may be made therein without departing from the spirit of the invention as defined by the scope of the appended claims.

What is claimed is:

1. An apparatus for mixing a first fluid with a second fluid, comprising:

a main first fluid tank;

a first fluid switch in fluid connection with the main first fluid tank;

a first mixing tank in fluid connection with the first fluid switch;

a second mixing tank in fluid connection with the first fluid switch, wherein the first fluid switch switches between the first mixing tank and the second mixing tank;

a means for providing a measured amount of a second fluid to the first mixing tank and the second mixing tank;

a mixture switch in fluid connection with the first mixing tank and the second mixing tank, wherein the mixture switch switches between the first mixing tank and the second mixing tank;

a main sprayer pump in fluid connection with the mixture switch; and a sprayer nozzle in fluid connection with the main sprayer pump.

2. The apparatus as claimed in claim 1, further comprising, a second fluid tank, in fluid connection with the means for providing a measured amount of a second fluid.

3. The apparatus as claimed in claim 2, further comprising, a control means electrically connected to the first fluid switch, the mixture switch and the means for providing a measured amount of a second fluid.

4. The apparatus as claimed in claim 3, further comprising a first fluid valve in fluid connection between the main first fluid tank and the first fluid switch, and wherein the first fluid valve is electrically connected to the control means.

5. The apparatus as claimed in claim 4, further comprising:

an empty sensor for the first mixing tank mechanically attached to the first mixing tank and electrically connected to the control means;

a full sensor for the first mixing tank mechanically attached to the first mixing tank and electrically connected to the control means, wherein a first mixing tank volume is defined between the empty sensor for the first mixing tank and the full sensor for the first mixing tank;

an empty sensor for the second mixing tank mechanically attached to the second mixing tank and electrically connected to the control means; and a full sensor for the second mixing tank mechanically attached to the first mixing tank and electrically connected to the control means, wherein a second mixing tank volume is defined between the empty sensor for the second mixing tank and the full sensor for the second mixing tank.

6. The apparatus as claimed in claim 5, wherein the main first fluid tank has a volume and the volume of the main first fluid tank is at least ten times the volume of the first mixing tank or the second mixing tank.

7. The apparatus as claimed in claim 6, wherein the first mixing tank has a volume between 1 and 20 gallons and the second mixing tank has a volume between 1 and 20 gallons.

8. The apparatus as claimed in claim 5, wherein the means for providing a measured amount of a second fluid comprises;

a second fluid switch in fluid connection with the first mixing tank and the second mixing tank; and a second fluid metering pump in fluid connection between the second fluid switch and the second fluid tank.

9. The apparatus as claimed in claim 8, where the second fluid metering pump, comprises:

a piston in a cylinder;

a first one way valve in fluid connection with the second fluid tank and the piston in a cylinder; and a second one way valve in fluid connection with the second fluid switch and the piston in a cylinder.

10. The apparatus as claimed in claim 5, wherein the means for providing a measured amount of a second fluid, comprises, a second fluid metering pump in fluid connection through the first fluid switch to the first mixing tank and the second mixing tank.

11. A method for mixing a first fluid and a second fluid, comprising the steps of:

providing a first fluid from a main first fluid tank to a first fluid switch;

directing the first fluid from the first fluid switch to a first mixing tank;

directing the second fluid from a second fluid tank to the first mixing tank;

drawing a mixture of the first fluid and second fluid from a second mixing tank through a mixture switch to a spray pump;

switching the direction of the first fluid flowing from the first fluid switch, from the first mixing tank to the second mixing tank;

switching the direction of the second fluid flowing from the second fluid tank, from the first mixing tank to the second mixing tank; and switching the mixture switch so that fluid is drawn from the first mixing tank.

12. The method, as claimed in claim 11, further comprising the steps of:

starting the flow of the second fluid to the first mixing tank;

starting the flow of the first fluid to the first mixing tank;

measuring the amount of second fluid provided to the first mixing tank;

stopping the flow of the second fluid to the first mixing tank, once a set amount of the second fluid is provided to the first mixing tank;

sensing when the first mixing tank is full;

stopping the flow of the first fluid to the first mixing tank, when the first mixing tank is sensed as full;

sensing when the second mixing tank is empty;

starting the flow of the second fluid to the second mixing tank;

staring the flow of the first fluid to the second mixing tank;

measuring the amount of second fluid provided to the second mixing tank;

stopping the flow of the second fluid to the second mixing tank, once a set amount of the second fluid is provided to the second mixing tank;

sensing when the second mixing tank is full; and stopping the flow of the first fluid to the second mixing tank, when the second mixing tank is sensed as full.

* * * * *